United States Patent
Nakashima et al.

(10) Patent No.: US 12,265,646 B2
(45) Date of Patent: Apr. 1, 2025

(54) SYSTEM AND NON-TRANSITORY STORAGE MEDIUM

(71) Applicant: TOYOTA JIDOSHA KABUSHIKI KAISHA, Toyota (JP)

(72) Inventors: Toyokazu Nakashima, Nagoya (JP); Takeshi Takemoto, Nagoya (JP); Naoko Yamafuji, Nagoya (JP); Naoya Oka, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 236 days.

(21) Appl. No.: 17/873,809

(22) Filed: Jul. 26, 2022

(65) Prior Publication Data
US 2023/0045367 A1    Feb. 9, 2023

(30) Foreign Application Priority Data

Aug. 3, 2021 (JP) ................................ 2021-127802

(51) Int. Cl.
| | |
|---|---|
| G06F 21/62 | (2013.01) |
| G06Q 10/20 | (2023.01) |
| G07C 5/00 | (2006.01) |
| G07C 5/10 | (2006.01) |

(52) U.S. Cl.
CPC ......... *G06F 21/6245* (2013.01); *G06Q 10/20* (2013.01); *G07C 5/008* (2013.01); *G07C 5/10* (2013.01)

(58) Field of Classification Search
CPC .... G06F 21/6245; G06Q 10/20; G07C 5/008; G07C 5/08; G07C 5/10
See application file for complete search history.

(56) References Cited

U.S. PATENT DOCUMENTS

| | | | |
|---|---|---|---|
| 2006/0041443 A1* | 2/2006 | Horvath | G06Q 30/06 358/1.18 |
| 2017/0352082 A1 | 12/2017 | Aziz et al. | |
| 2019/0095963 A1 | 3/2019 | Martin | |
| 2020/0042727 A1 | 2/2020 | Ogura et al. | |
| 2020/0160412 A1 | 5/2020 | Osumi et al. | |
| 2020/0361450 A1* | 11/2020 | Noguchi | B62D 15/027 |
| 2022/0050925 A1* | 2/2022 | Gyllenram | G06F 21/6263 |

FOREIGN PATENT DOCUMENTS

| | | | |
|---|---|---|---|
| DE | 102020004792 A1 | * | 11/2020 |
| JP | 2004-280858 A | | 10/2004 |
| JP | 2019-144801 A | | 8/2019 |
| JP | 2020-024511 A | | 2/2020 |
| WO | WO-2020250302 A1 | * | 12/2020 |

* cited by examiner

*Primary Examiner* — Lesa M Kennedy
(74) *Attorney, Agent, or Firm* — Oliff PLC

(57) ABSTRACT

A system includes a server including a controller. The controller is configured to obtain information regarding consent or non-consent of a user of a vehicle to disclosure of history data of the vehicle to a third party, and determine, when determination is made that consent of the user is not obtained, whether to transmit a signal that prompts for obtaining consent of the user, based on at least one of the history data of the vehicle and user activity information of the user.

12 Claims, 5 Drawing Sheets

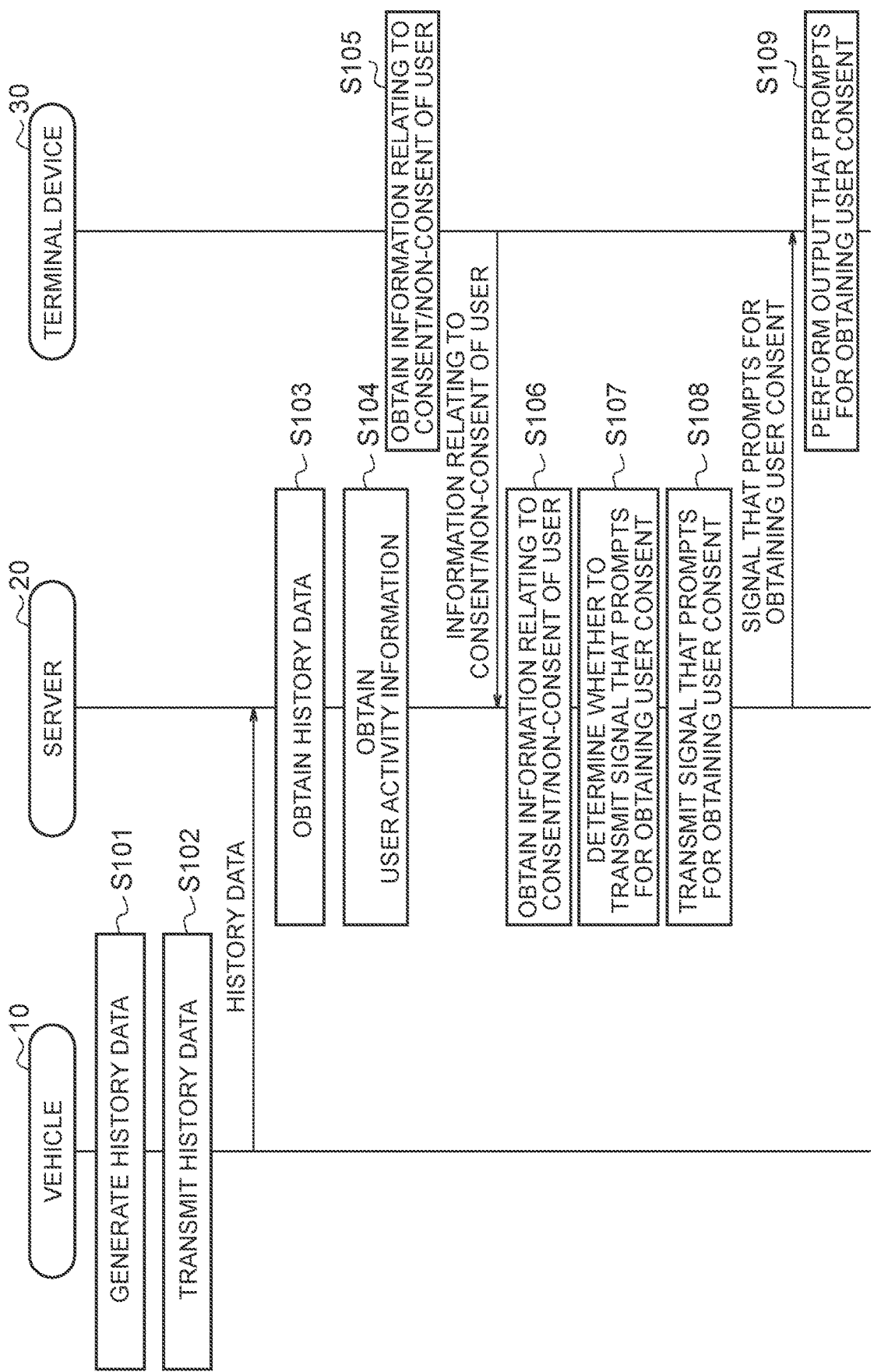

SYSTEM AND NON-TRANSITORY STORAGE MEDIUM

CROSS-REFERENCE TO RELATED APPLICATION

This application claims priority to Japanese Patent Application No. 2021-127802 filed on Aug. 3, 2021, incorporated herein by reference in its entirety.

BACKGROUND

1. Technical Field

The present disclosure relates to a system and a non-transitory storage medium.

2. Description of Related Art

There is technology known for obtaining consent of a user regarding history data of a vehicle. For example, Japanese Unexamined Patent Application Publication No. 2020-24511 (JP 2020-24511 A) discloses technology for, when providing personal data of a user to a third party, determining the necessity of obtaining consent from the user, in accordance with a difference of the personal data from personal data provided to a third party with the consent of the user in the past.

SUMMARY

There has been room for improvement in the technology for obtaining user consent regarding vehicle history data.

The present disclosure provides a technique for obtaining user consent regarding history data of a vehicle.

A first aspect of the present disclosure is a system. The system includes a server including a controller. The controller is configured to obtain information regarding consent or non-consent of a user of a vehicle to disclosure of history data of the vehicle to a third party, and determine, when determination is made that consent of the user is not obtained, whether to transmit a signal that prompts for obtaining consent of the user, based on at least one of the history data of the vehicle and user activity information of the user.

In the first aspect, the user activity information may include history data of a terminal device owned by the user. The controller may be configured to transmit a signal that prompts for obtaining consent of the user based on the user activity information when determination is made that the user intends to sell the vehicle.

In the first aspect, the user activity information may include history of maintenance or inspection of the vehicle. The controller may be configured to transmit a signal that prompts for obtaining consent of the user based on the user activity information when determination is made that the vehicle is periodically maintained or inspected.

In the first aspect, the controller may be configured to transmit a signal that prompts for obtaining consent of the user based on the history data of the vehicle when determination is made that the vehicle has been in an accident.

In the first aspect, the controller may be configured to calculate a score in which a state of the vehicle is quantified based on the history data of the vehicle. The controller may be configured to transmit a signal that prompts for obtaining consent of the user when determination is made that the score is included in a predetermined range indicating that the state of the vehicle is good.

In the first aspect, the controller may be configured to transmit a signal that prompts for obtaining consent of the user when determination is made that the history data of the vehicle contains information for improving an appraisal amount of the vehicle.

In the first aspect, the signal that prompts for obtaining consent of the user may include information indicating that the appraisal amount of the vehicle is improved by disclosing the history data of the vehicle to a third party.

In the first aspect, the system includes a terminal device. The terminal device is configured to output that prompts for obtaining consent of the user when the signal is received from the controller.

In the first aspect, the user activity information may include history data of the terminal device owned by the user. The controller may be configured to transmit a signal that prompts for obtaining consent of the user to the terminal device when determination is made that the user intends to sell the vehicle, based on the user activity information.

In the first aspect, the user activity information may include history of maintenance or inspection of the vehicle. The controller may be configured to transmit a signal that prompts for obtaining consent of the user to the terminal device based on the user activity information when determination is made that the vehicle is periodically maintained or inspected.

In the first aspect, the controller may be configured to transmit a signal that prompts for obtaining consent of the user to the terminal device based on the history data of the vehicle when determination is made that the vehicle has been in an accident.

In the first aspect, the controller may be configured to calculate a score in which a state of the vehicle is quantified based on the history data of the vehicle. The controller may be configured to transmit a signal that prompts for obtaining consent of the user to the terminal device when determination is made that the score is included in a predetermined range indicating that the state of the vehicle is good.

In the first aspect, the controller may be configured to transmit a signal that prompts for obtaining consent of the user to the terminal device when determination is made that the history data of the vehicle contains information for improving an appraisal amount of the vehicle.

In the first aspect, the signal that prompts for obtaining consent of the user may include information indicating that the appraisal amount of the vehicle is improved by disclosing the history data of the vehicle to a third party.

A second aspect of the present disclosure is a non-transitory storage medium storing instructions that are executable by one or more processors in a computer configured to communicate with a server and that cause the one or more processors to perform functions. The functions include obtaining information regarding consent or non-consent of a user of a vehicle to disclosure of history data of the vehicle to a third party, determining, when determination is made that consent of the user is not obtained, through communication with the server, whether to prompt for obtaining consent of the user, based on at least one of the history data of the vehicle and user activity information of the user, and outputting that prompts for obtaining consent of the user, when determination is made to prompt for obtaining of consent of the user.

In the second aspect, the functions may include outputting that prompts for obtaining consent of the user based on the user activity information, when determination is made that the user intends to sell the vehicle. The user activity information may include history data of a terminal device owned by the user.

In the second aspect, the functions may include outputting that prompts for obtaining consent of the user based on the user activity information, when determination is made that the vehicle is periodically maintained or inspected. The user activity information may include history of maintenance or inspection of the vehicle.

In the second aspect, the functions may include outputting that prompts for obtaining consent of the user based on the history data of the vehicle, when determination is made that the vehicle has been in an accident.

In the second aspect, the functions may include outputting that prompts for obtaining consent of the user, when determination is made that the history data of the vehicle contains information that improves an appraisal amount of the vehicle.

In the second aspect, the output that prompts for obtaining consent of the user may include information indicating that the appraisal amount of the vehicle is improved by disclosing the history data of the vehicle to a third party.

According to the first aspect and the second aspect of the present disclosure, the technology for obtaining user consent regarding the history data of the vehicle is improved.

BRIEF DESCRIPTION OF THE DRAWINGS

Features, advantages, and technical and industrial significance of exemplary embodiments of the disclosure is described below with reference to the accompanying drawings, in which like signs denote like elements, and wherein:

FIG. 5 is a flowchart showing an example of operations of the system.

DETAILED DESCRIPTION OF EMBODIMENTS

An embodiment of the present disclosure is described below.

Overview of Embodiment

Figure 1:
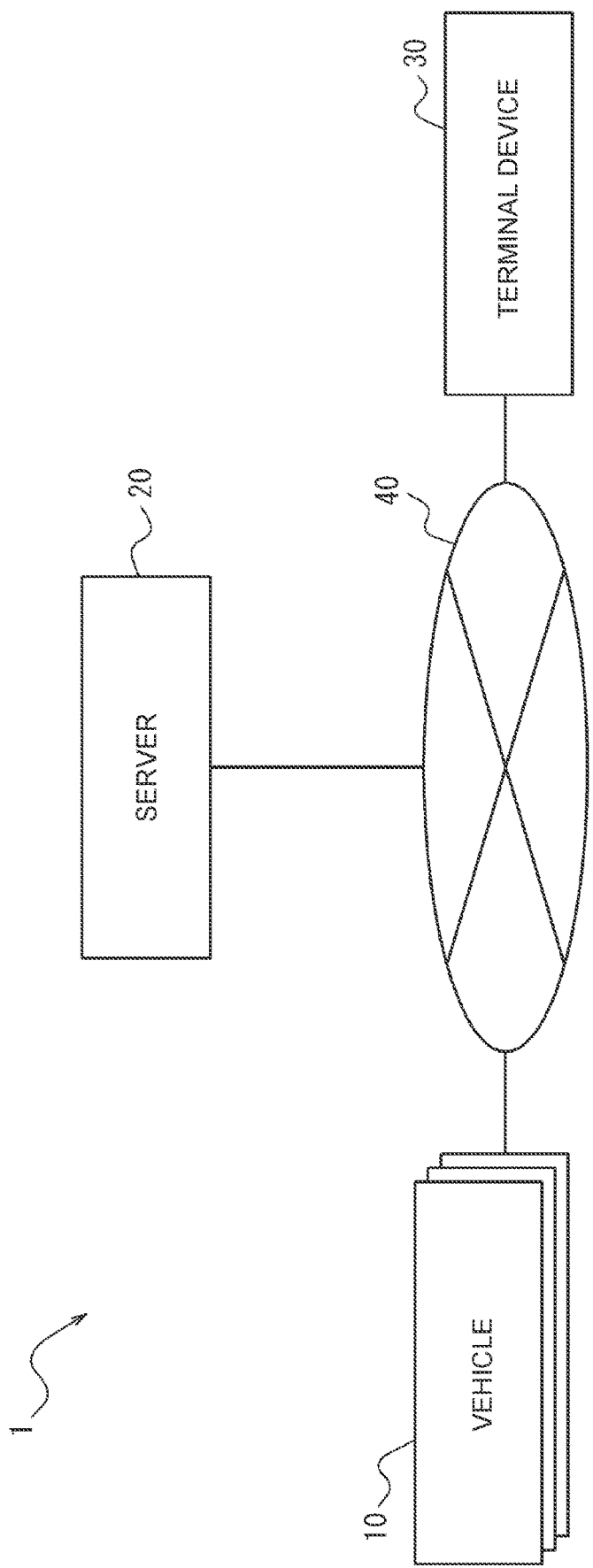
FIG. 1 is a block diagram illustrating a schematic configuration of a system according to an embodiment of the present disclosure.

An outline of a system 1 according to an embodiment of the present disclosure is described with reference to FIG. 1. FIG. 1 is a block diagram illustrating a schematic configuration of the system 1. The system 1 includes a vehicle 10, a server 20, and a terminal device 30.

The vehicle 10 is, for example, an automobile, but is not limited to this, and may be any vehicle. Examples of automobiles include, but are not limited to, a gasoline vehicle, a battery electric vehicle (BEV), a hybrid electric vehicle (HEV), a plug-in hybrid electric vehicle (PHEV), a fuel cell electric vehicle (FCEV), and so forth. The number of vehicles 10 included in the system 1 may be optionally set.

The server 20 is one computer, or multiple computers that are capable of communicating with each other. The terminal device 30 is a computer such as a personal computer, a smartphone, a tablet terminal, or the like, for example.

FIG. 1 illustrates a plurality of vehicles 10, one server 20, and one terminal device 30, for the sake of convenience of description. However, the system 1 may include any number of vehicles 10, servers 20, and terminal devices 30. The vehicles 10, the server 20, and the terminal device 30 are communicably connected to a network 40 including, for example, the Internet, a mobile communication network, and so forth.

First, an overview of the present embodiment is described, and details thereof is described later. The server 20 obtains information regarding consent/non-consent of a user of the vehicle 10 to disclosure of history data of the vehicle 10 to a third party. When determination is made that there is no user consent, the server 20 determines whether to transmit a signal prompting to obtain user consent based on at least one of the history data of the vehicle 10 and user activity information. The history data of the vehicle 10 is, for example, data measured by using a sensor installed in the vehicle 10. The history data of the vehicle 10 is used to assess the value of the vehicle 10 (e.g., the appraisal amount of the vehicle 10) when the vehicle 10 is sold or bought as a used car, for example. The user activity information is, for example, information indicating user activity that is obtained from a terminal device owned by the user. When the server 20 determines to transmit a signal that prompts for obtaining user consent, the server 20 transmits the signal to a terminal device 30 installed at a shop (dealer) or the like that sold the vehicle 10 to the user, for example.

In this way, according to the present embodiment, when there is no user consent to disclose the history data of the vehicle 10 to a third party, determination is made regarding whether to send a signal that prompts for obtaining user consent, based on at least one of the history data of the vehicle 10 and the user activity information. Accordingly, a signal that prompts for obtaining user consent can be transmitted just in situations in which user consent is easily obtained, based on at least one of the history data of the vehicle 10 and the user activity information. Thus, the technology of obtaining the user consent regarding the history data of the vehicle 10 is improved with regard to the point of improved likelihood of obtaining the consent of the user of the vehicle 10.

Figure 2:
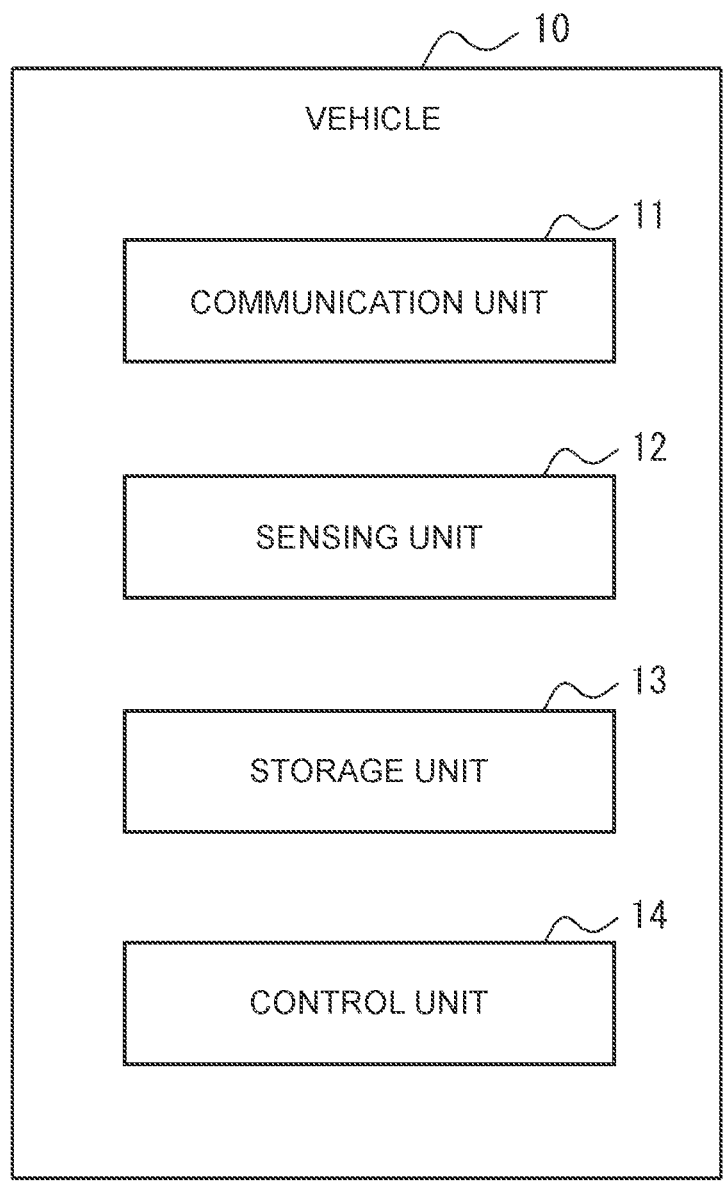
FIG. 2 is a block diagram illustrating a schematic configuration of a vehicle.
Figure 3:
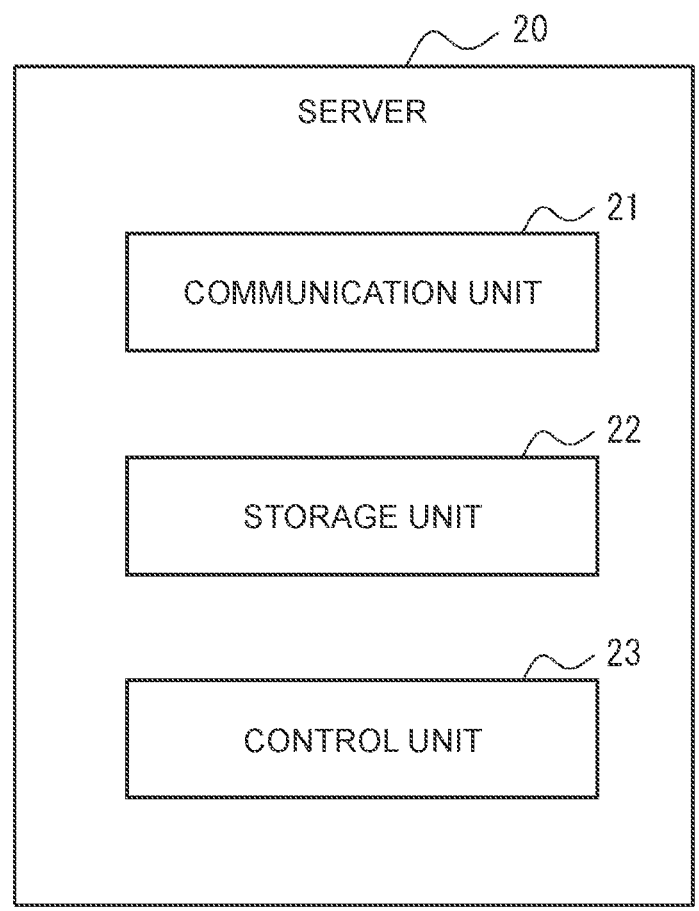
FIG. 3 is a block diagram illustrating a schematic configuration of a server.
Figure 4:
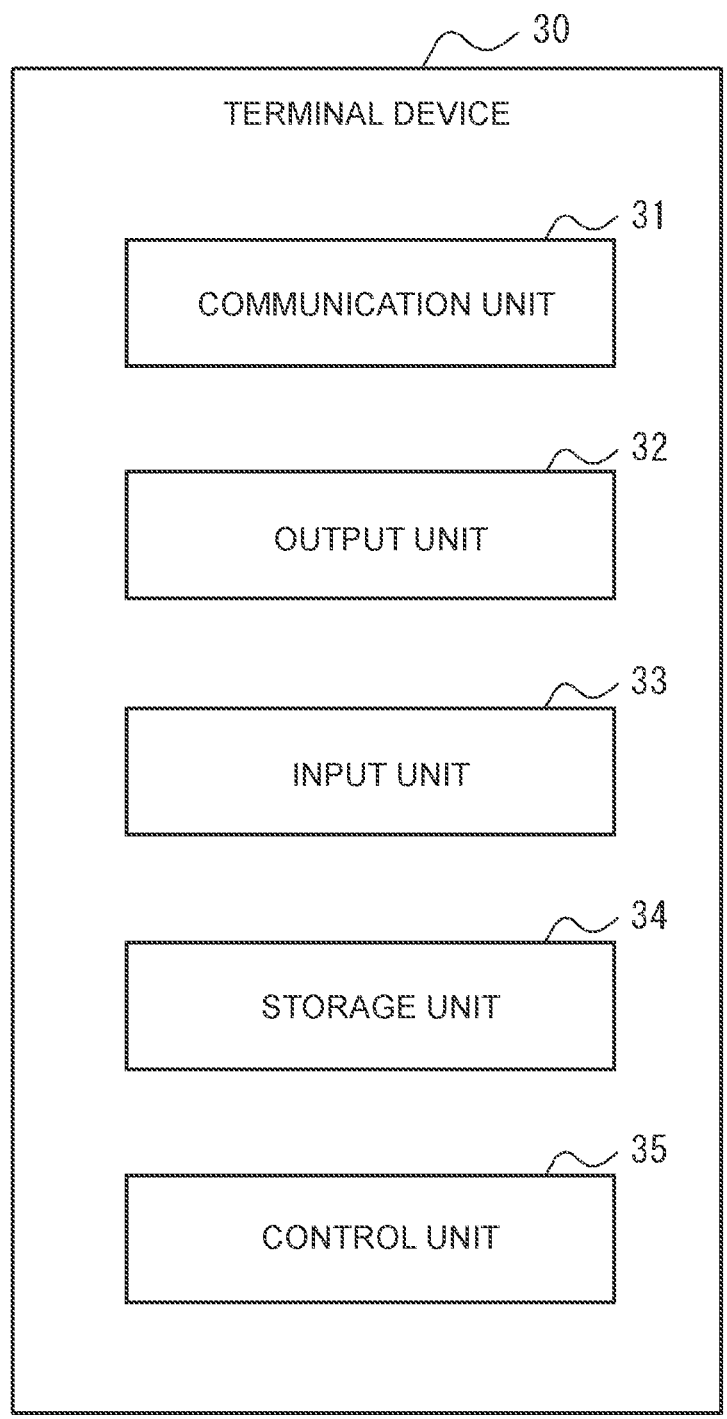
FIG. 4 is a block diagram illustrating a schematic configuration of a terminal device.

Next, each of the configurations in the system 1 is described in detail with reference to FIGS. 2, 3 and 4. FIG. 2 is a block diagram illustrating a schematic configuration of the vehicle 10. FIG. 3 is a block diagram illustrating a schematic configuration of the server 20. FIG. 4 is a block diagram illustrating a schematic configuration of the terminal device 30.

Configuration of Vehicle

As illustrated in FIG. 2, the vehicle 10 includes a communication unit 11, a sensing unit 12, a storage unit 13, and a control unit 14.

The communication unit 11 includes one or more communication interfaces for connecting to the network 40. The communication interface included in the communication unit 11 conforms to, for example, mobile communication standards such as 4th generation (4G) or 5th generation (5G), nonetheless, the standards that the communication interface conforms to are not limited thereto, and the communication interface may conform to any communication standard. In the present embodiment, the vehicle 10 communicates with the server 20 via the communication unit 11 and the network 40. Note that the vehicle 10 may communicate with a computer other than the server 20 according to the present embodiment via the communication unit 11 and the network 40.

The sensing unit 12 includes one or more sensors. The sensors are used to measure data of the same types as the types of data included in the history data of the vehicle 10. Examples of the sensors include a speed sensor, an acceleration sensor, a gyro sensor, an image sensor, an infrared sensor, and so forth. Examples of the sensors may also include a receiver for a satellite positioning system, such as the Global Positioning System (GPS) or the like. The sensing unit 12 senses events such as speed, acceleration, angular velocity, whether the vehicle 10 has been subjected to impact, and presence/absence of failure.

For example, the sensing unit 12 may include an odometer. The odometer senses a change in the traveled distance of the vehicle 10 and outputs the traveled distance as the total travelled distance of the vehicle 10. Alternatively, the sensing unit 12 may include an on-board diagnostics device (OBD device). The OBD device detects occurrence of an abnormality in the in-vehicle equipment installed in the vehicle 10, and outputs the occurrence of abnormality as failure history of the vehicle 10. The sensing unit 12 may include an impact sensor. The impact sensor senses a predetermined impact applied to the vehicle 10 and outputs the impact as history of the impact that the vehicle 10 has been subjected to.

The storage unit 13 includes one or more memory devices. Examples of memory include semiconductor memory, magnetic memory, optical memory, and so forth, but are not limited thereto. Each memory device included in the storage unit 13 may function as, for example, a main storage device, an auxiliary storage device, or cache memory. The storage unit 13 stores optional information to be used for operation of the vehicle 10. For example, the storage unit 13 may store a system program, an application program, embedded software, and so forth. The information stored in the storage unit 13 may be updatable by information obtained from the network 40 via the communication unit 11, for example.

The control unit 14 includes one or more processors, one or more programmable circuits, one or more dedicated circuits, or a combination thereof. Examples of the processor include a general-purpose processor such as a central processing unit (CPU) or a graphics processing unit (GPU), or a dedicated processor specialized for a particular process, but are not limited thereto. Examples of the programmable circuit include a field-programmable gate array (FPGA), but are not limited thereto. Examples of the dedicated circuit include an application specific integrated circuit (ASIC), but are not limited thereto. The control unit 14 controls the overall operations of the vehicle 10.

Configuration of Server

As illustrated in FIG. 3, the server 20 includes a communication unit 21, a storage unit 22, and a control unit 23.

The communication unit 21 includes one or more communication interfaces for connecting to the network 40. The communication interface included in the communication unit 21 conforms to a mobile communication standard, a wired local area network (LAN) standard, or a wireless LAN standard, for example, but is not limited to these, and may conform to any communication standard. In the present embodiment, the server 20 communicates with the vehicle 10 and the terminal device 30 via the communication unit 21 and the network 40. Note that the server 20 may communicate with a computer other than the vehicle 10 and the terminal device 30 according to the present embodiment, via the communication unit 21 and the network 40.

The storage unit 22 includes one or more memory devices. The memory included in the storage unit 22 may function as, for example, a main storage device, an auxiliary storage device, or cache memory. The storage unit 22 stores optional information to be used for operations of the server 20. For example, the storage unit 22 may store a system program, an application program, a database, map information, and so forth. The information stored in the storage unit 22 may be updatable with information received from the network 40 via the communication unit 21, for example.

The control unit 23 includes one or more processors, one or more programmable circuits, one or more dedicated circuits, or a combination thereof. Examples of the processor include a general-purpose processor such as a CPU or a GPU, or a dedicated processor specialized for a particular process, but are not limited thereto. Examples of the programmable circuit include an FPGA, but are not limited thereto. Examples of the dedicated circuit include an ASIC, but are not limited thereto. The control unit 23 controls operations of the entire server 20.

Configuration of Terminal Device

As illustrated in FIG. 4, the terminal device 30 includes a communication unit 31, an output unit 32, an input unit 33, a storage unit 34, and a control unit 35.

The communication unit 31 includes one or more communication interfaces for connecting to the network 40. The communication interface included in the communication unit 31 conforms to, for example, mobile communication standards such as 4G, 5G, and so forth, nonetheless, the standards that the communication interface conforms to are not limited thereto, and the communication interface may conform to any communication standard. In the present embodiment, the terminal device 30 communicates with the server 20 via the communication unit 31 and the network 40. Note that the terminal device 30 may communicate with a computer other than the server 20 according to the present embodiment via the communication unit 31 and the network 40.

The output unit 32 includes one or more output devices. Examples of the output devices included in the output unit 32 include a display, a speaker, and so forth. The output unit 32 outputs information as images, sound, or the like.

The input unit 33 includes at least one of input devices. Examples of the input device included in the input unit 33 include, for example, a touch panel, a camera, a microphone, an IC card reader, and so forth. The input unit 33 accepts input operations performed by a user.

The storage unit 34 includes one or more memory devices. Memory included in the storage unit 34 may function as, for example, a main storage device, an auxiliary storage device, or cache memory. The storage unit 34 stores optional information to be used for operations of the terminal device 30. For example, the storage unit 34 may store a system program, an application program, embedded software, and so forth. The information stored in the storage unit 34 may be updatable with information received from the network 40 via the communication unit 31, for example.

The control unit 35 includes one or more processors, one or more programmable circuits, one or more dedicated circuits, or a combination thereof. Examples of the processor include a general-purpose processor such as a CPU or a GPU, or a dedicated processor specialized for a particular process, but are not limited thereto. Examples of the programmable circuit include an FPGA, but are not limited thereto. Examples of the dedicated circuit include an ASIC, but are not limited thereto. The control unit 35 controls operations of the entire terminal device 30.

Operation Flow of System

Operations of the system 1 according to the present embodiment is described with reference to FIG. 5. FIG. 5 is a flowchart showing an example of operations of the system 1. Operations of the system 1 shown in FIG. 5 correspond to a method executed by the vehicle 10, the server 20, or the terminal device 30 according to the present embodiment.

Step S101: The control unit 14 of the vehicle 10 generates history data of the vehicle 10.

Examples of the history data of the vehicle 10 include data regarding traveled distance, data regarding usage status, data regarding failure status, data regarding maintenance status, and so forth.

The data regarding the traveled distance includes time-series data such as the traveled distance, speed, acceleration, and travelling time, of the vehicle 10, and so forth. It should be noted however, that the data regarding the traveled distance is not limited to these, and may include any data used for assessing the traveled distance of the vehicle 10.

The data regarding the usage status includes history of performing engine on/off operations of the vehicle 10, accelerator operation history, brake operation history, steering wheel operation history, and so forth. The data regarding the usage status may include time-series data regarding how far the fuel tank is filled with fuel, or how far the battery is charged. It should be noted however, that the data regarding the usage status is not limited to these, and may include any data used for assessing the usage status of the vehicle 10.

The data regarding the failure status includes history of impact that the vehicle 10 has been subjected to, failure history generated by the OBD device, failure history/error history of in-vehicle equipment/parts, and so forth. It should be noted however, that the data regarding the failure status is not limited to these, and may include any data used for assessing the failure status of the vehicle 10.

The data regarding the maintenance status includes installation history and replacement history of the in-vehicle equipment/parts of the vehicle 10, and so forth. It should be noted however, that the data regarding the maintenance status is not limited to these, and may include any data used for assessing the maintenance status of the vehicle 10.

The history data of the vehicle 10 may include data measured by using sensors installed in the vehicle 10. Specifically, the control unit 14 of the vehicle 10 measures one or more types of data to be included in the above-described history data of the vehicle 10, by using one or more sensors included in the sensing unit 12. The control unit 14 may include one or more types of measured data, and the clock time of measurement thereof, in the history data of the vehicle 10. Accordingly, when assessing the value of the vehicle 10 when selling or buying the vehicle 10 as a used car, for example, referring to the history data of the vehicle 10 enables information to be obtained that cannot be determined simply by looking at the vehicle 10 itself, and the precision of the value assessment of the vehicle 10 can be improved. It should be noted however, that the history data of the vehicle 10 may include data other than the data measured by using the sensors installed in the vehicle 10, such as maintenance or inspection items and results at the maintenance shop, for example. Such data may be written to the storage unit 13 of the vehicle 10 at the time of maintenance or inspection at the maintenance shop. The control unit 14 may include one or more types of data stored in the storage unit 13 in the history data of the vehicle 10.

Step S102: The control unit 14 of the vehicle 10 transmits the history data of the vehicle 10.

Specifically, the control unit 14 of the vehicle 10 transmits the history data of the vehicle 10 to the server 20. The control unit 14 may repeatedly transmit the history data of the vehicle 10 at a predetermined timing. The predetermined timing may be periodic or may not be periodic. Specifically, the predetermined timing may be a predetermined time interval, such as once every hour, or may be a timing at which new history data is generated, or the like.

Step S103: The control unit 23 of the server 20 obtains the history data of the vehicle 10.

Any method may be employed for obtaining history data. For example, the control unit 23 of the server 20 may receive the history data of the vehicle 10 directly from the vehicle 10 via the communication unit 21 and the network 40. Alternatively, the control unit 23 may receive the history data of the vehicle 10 from another server that receives the history data from the vehicle 10 via the communication unit 21 and the network 40, thereby receiving the history data of the vehicle 10 indirectly from the vehicle 10. The control unit 23 may add the obtained history data of the vehicle 10 to the history data of the vehicle 10 already stored in the storage unit 22, so as to be stored as time-series data. Alternatively, the control unit 23 may overwrite the history data of the vehicle 10 already stored in the storage unit 22 with the obtained history data of the vehicle 10, so as to be stored as time-series data.

Step S104: The control unit 23 of the server 20 obtains user activity information of the user of the vehicle 10.

The user activity information is information indicating the activity of the user of the vehicle 10. The user activity information is used for determining whether the user consents to disclose the history data of the vehicle 10 to a third party. Examples of the user activity information include history data of a terminal device owned by the user of the vehicle 10, or history of maintenance and inspection of the vehicle 10.

Any method may be employed for obtaining user activity information. For example, the control unit 23 of the server 20 may obtain the history data stored in the terminal device from the terminal device owned by the user via the communication unit 21 and the network 40. Alternatively, the control unit 23 may obtain history of maintenance or inspection of the vehicle 10 from a terminal device 30 installed at the dealer of the vehicle 10 via the communication unit 21 and the network 40. The control unit 23 may store the obtained user activity information in the storage unit 22.

Step S105: The control unit 35 of the terminal device 30 obtains information regarding consent/non-consent of the user of the vehicle 10 to disclosure of the history data of the vehicle 10 to a third party.

The information regarding consent/non-consent of the user of the vehicle 10 to disclosure of the history data of the vehicle 10 to a third party is information indicating whether the user of the vehicle 10 consents to disclosure of the history data to a third party. Disclosing the history data to a third party may include making the history data viewable to the third party, and providing the history data to the third party. Further, disclosing the history data to a third party may include not only disclosing the history data to a third party without change, but also editing or excerpting the history data and disclosing the history data in this state. For example, the history data is used for value assessment (for example, calculation of the appraisal amount) when the vehicle 10 is sold as a used car. Accordingly, the history data may be disclosed to a third party, such as a used car dealer or a person who wants to purchase a used car, with the consent of the user of the vehicle 10.

In the present embodiment, user consent to disclose the history data of the vehicle 10 to a third party is to be obtained from each user of the vehicle 10. Accordingly, when ownership of the vehicle 10 is transferred, even though the consent of the previous user of the vehicle 10 is obtained, the consent of the current user of the vehicle 10 needs to be separately obtained as well. Further, once the consent to disclose the history data of the vehicle 10 to a third party is obtained from the user, this constitutes obtaining consent for all the history data obtained while the user owned the vehicle 10. Note however, that handling of consent to disclose history data to a third party is not limited to the example described in the present embodiment. Hereinafter, "consent of user to disclose history data of the vehicle 10 to a third party" also is simply referred to as "consent of user" or "user consent".

Any method can be employed to obtain information regarding consent/non-consent of the user. For example, the control unit 35 of the terminal device 30 may accept input of information regarding consent/non-consent of the user via the input unit 33. Alternatively, the control unit 35 may store information regarding consent/non-consent of the user in the storage unit 34 in advance. The control unit 35 may transmit information regarding consent/non-consent of the user to the server 20 via the communication unit 31 and the network 40.

Step S106: The control unit 23 of the server 20 obtains information regarding consent/non-consent of the user of the vehicle 10 to disclosure of the history data of the vehicle 10 to a third party.

The control unit 23 of the server 20 receives information regarding consent/non-consent of the user from the terminal device 30 via the communication unit 21 and the network 40. Alternatively, the control unit 23 may store information regarding consent/non-consent of the user in the storage unit 22 in advance.

Step S107: When determination is made that there is no user consent, the control unit 23 of the server 20 determines whether to transmit a signal that prompts for obtaining user consent, based on at least one of the history data of the vehicle 10, and the user activity information.

Any method may be employed for determining whether to transmit the signal that prompts for obtaining user consent. For example, the control unit 23 of the server 20 may determine whether to transmit the signal that prompts for obtaining user consent, based on the user activity information.

As an example, the control unit 23 of the server 20 may determine whether the user intends to sell the vehicle 10, based on the user activity information. For example, the control unit 23 determines whether the user intends to sell the vehicle 10, based on the history data of the terminal device owned by the user, which is included in the user activity information. The history data of the terminal device owned by the user includes, for example, operating history and history of location information. The control unit 23 may determine that the user intends to sell the vehicle 10 when the operating history of the terminal device owned by the user includes history of access to a website related to selling used cars. Alternatively, the control unit 23 may determine that the user intends to sell the vehicle 10 when the history of location information of the terminal device owned by the user includes coordinates information of a used car dealer.

When determination is made that the user intends to sell the vehicle 10 based on the user activity information, the control unit 23 may determine to transmit a signal that prompts for obtaining user consent. In this way, by prompting obtaining of user consent to disclose the history data of the vehicle 10 to a third party only when determination is made that the user intends to sell the vehicle 10, user consent can be obtained more readily.

As another example, the control unit 23 of the server 20 may determine whether the vehicle 10 is periodically maintained or inspected, based on the user activity information. For example, the control unit 23 determines whether the vehicle 10 is periodically maintained or inspected, based on the history of maintenance or inspection of the vehicle 10 included in the user activity information. The control unit 23 may determine that the vehicle 10 is periodically maintained or inspected when implementation of maintenance or inspection is recorded in the history of maintenance or inspection of the vehicle 10 no less than a predetermined number of times. The predetermined number of times may be changed according to the years from the year of production of the vehicle 10. Alternatively, the control unit 23 may determine that the vehicle 10 is periodically maintained or inspected when a predetermined period has not elapsed since the last maintenance or inspection was performed, based on the history of maintenance or inspection of the vehicle 10.

In general, when the vehicle 10 is periodically maintained or inspected, the state of the vehicle 10 tends to be better than when it is not maintained or inspected. Accordingly, by disclosing the history data of the vehicle 10 to a third party such as a used car dealer or a person who wants to purchase a used car, the value of the vehicle 10 (for example, the appraisal amount of the vehicle 10) may be assessed to be high. When determination is made that the vehicle 10 is periodically maintained or inspected, based on the user activity information, the control unit 23 may determine to transmit a signal that prompts for obtaining user consent. In this way, by prompting obtaining of user consent to disclose the history data of the vehicle 10 to a third party only when determination is made that the vehicle 10 is periodically maintained or inspected, user consent can be obtained more readily.

Also, for example, the control unit 23 of the server 20 may determine whether to transmit a signal that prompts for obtaining user consent, based on the history data of the vehicle 10.

As an example, the control unit 23 of the server 20 may determine whether the vehicle 10 has been in an accident, based on the history data of the vehicle 10. For example, the control unit 23 may determine whether the data regarding the failure status included in the history data includes history of the vehicle 10 being subjected to impact of a predetermined amount or more. The control unit 23 determines that the vehicle 10 has been in an accident when the history of being subjected to impact of a predetermined amount or more is included. Alternatively, the control unit 23 may determine whether data regarding the failure status includes information indicating an accident in the failure history generated by the OBD device. The control unit 23 determines that the vehicle 10 has been in an accident when the failure history generated by the OBD device contains information indicating an accident.

Generally, whether there is any past accident history or repair history of the vehicle 10 is taken into consideration in value assessment of the vehicle 10, but what kind of influence the accident has on the capabilities of the vehicle 10 to travel, or the like, is seldom investigated in detail. Accordingly, when the vehicle 10 has a history of accidents or repairs, the value of the vehicle 10 may be assessed unreasonably low. In such a case, disclosing the history data of the vehicle 10 to a third party such as a used car dealer or a person who wants to purchase a used car enables changes in capabilities of the vehicle 10 to travel, or the like, before and after the accident, to be assessed, and the value of the vehicle 10 can be appropriately assessed. The control unit 23 may determine to transmit a signal that prompts for obtaining user consent when determination is made that the vehicle 10 has been in an accident, based on the history data of the vehicle 10. In this way, by prompting obtaining of user consent to disclose the history data of the vehicle 10 to a third party, only when determination is made that the vehicle 10 has been in an accident, user consent can be obtained more readily.

As another example, the control unit 23 of the server 20 may determine whether the state of the vehicle 10 is good, based on the history data of the vehicle 10. Specifically, the control unit 23 may calculate a score that quantifies the state of the vehicle 10 based on the history data of the vehicle 10, and whether the score is included in a predetermined range indicating that the state of the vehicle 10 is good may be determined. For example, the control unit 23 may calculate the total traveled distance of the vehicle 10 based on the history data, and determine that the state of the vehicle 10 is good when the total traveled distance of the vehicle 10 is included in a predetermined range. Also, for example, the control unit 23 may calculate an appraisal amount of the vehicle 10 by price appraisal simulation based on the history data, and determine that the state of the vehicle 10 is good when the appraisal amount of the vehicle 10 is included in a predetermined range. Alternatively, the control unit 23 may calculate the number of failures or errors of in-vehicle equipment of the vehicle 10 based on the history data, and determine that the state of the vehicle 10 is good when the number of failures or errors of the in-vehicle equipment of the vehicle 10 is included in a predetermined range. Further, the control unit 23 may determine whether one or more sets of assessment target data included in the history data satisfy respective reference conditions, and determine that the state of the vehicle 10 is good when the number of sets of assessment target data satisfying the reference conditions is included in a predetermined range.

Generally, the value of the vehicle 10 can be assessed to be high by disclosing information indicating that the vehicle 10 is in a good state to a third party, such as a used car dealer or a person who wants to purchase a used car. The control unit 23 may calculate a score that quantifies the state of the vehicle 10 based on the history data of the vehicle 10, and determine to transmit a signal that prompts for obtaining user consent when determination is made that the score is included in a predetermined range indicating that the state of the vehicle 10 is good. In this way, by prompting obtaining of user consent to disclose the history data of the vehicle 10 to a third party when the state of the vehicle 10 is determined to be good, user consent can be obtained more readily.

As yet another example, the control unit 23 of the server 20 may determine whether the history data of the vehicle 10 includes information that would improve the appraisal amount of the vehicle 10. For example, the control unit 23 may store data items that would improve the appraisal amount of the vehicle 10 in the storage unit 22 in advance. An example of a data item that would improve the appraisal amount of the vehicle 10 may be failure history generated by the OBD device. The fact that the failure history of the vehicle 10 is recorded by the OBD device may be favorably assessed by a used car dealer, a person who wants to purchase a used car, or the like, and lead to improvement in the appraisal amount of the vehicle 10. The control unit 23 may determine that the history data of the vehicle 10 includes information that would improve the appraisal amount of the vehicle 10 when the data of the data item stored in the storage unit 22 is included therein. Alternatively, the control unit 23 may perform a price appraisal simulation of the vehicle 10, and calculate a first appraisal amount of the vehicle 10 when the history data of the vehicle 10 is used, and a second appraisal amount of the vehicle 10 when the history data of the vehicle 10 is not used. When determination is made that the first appraisal amount is higher than the second appraisal amount, the control unit 23 may determine that the history data of the vehicle 10 includes information that would improve the appraisal amount of the vehicle 10.

When determination is made that the history data of the vehicle 10 includes information that would improve the appraisal amount of the vehicle 10, the control unit 23 may determine to transmit a signal that prompts for obtaining user consent. Thus, by prompting obtaining of user consent to disclose the history data of the vehicle 10 to a third party when determination is made that the history data of the vehicle 10 contains information that would improve the appraisal amount of the vehicle 10, user consent can be obtained more readily.

Step S108: The control unit 23 of the server 20 transmits a signal that prompts for obtaining user consent.

Specifically, when determination is made in step S107 for the control unit 23 of the server 20 to transmit a signal that prompts for obtaining user consent, the control unit 23 transmits a signal that prompts for obtaining user consent to the terminal device 30 that is installed at the dealer of the vehicle 10, via the communication unit 21 and the network 40. For example, a signal prompting obtaining consent from the user may include a command to output a message, "Consent to disclose the history data to a third party has not been obtained from the user of the vehicle 10. Please obtain consent from the user of vehicle 10." from the output unit 32 of the terminal device 30.

The signal that prompts for obtaining user consent may include information indicating that the appraisal amount of the vehicle 10 is improved by disclosing the history data of the vehicle 10 to a third party. When the control unit 23 of the server 20 determines in step S107 that the history data includes information that would improve the appraisal amount of the vehicle 10 based on at least one of the history data and the user activity information of the vehicle 10, the signal that prompts for obtaining user consent may include information indicating that the appraisal amount of the vehicle 10 is improved by disclosing the history data of the vehicle 10 to a third party. The information indicating that the appraisal amount of the vehicle 10 is improved may be, for example, the difference between the first appraisal amount of the vehicle 10 when the history data of the vehicle 10 is used and the second appraisal amount of the vehicle 10 when the history data of the vehicle 10 is not used. Thus, when obtaining user consent to disclose the history data of the vehicle 10 to a third party, the advantage of disclosing the history data of the vehicle 10 can be demonstrated, and user consent can be obtained more readily.

Step S109: The control unit 35 of the terminal device 30 performs output that prompts for obtaining user consent.

When the control unit 35 of the terminal device 30 receives the signal from the server 20 for prompting obtaining of user consent, the control unit 35 performs output for prompting obtaining of consent from the user of the vehicle 10. For example, the control unit 35 may output a message, "Consent to disclose the history data to a third party has not been obtained from the user of the vehicle 10. Please obtain consent from the user of vehicle 10." via the output unit 32.

Thus, a salesperson in the dealer of the vehicle 10 can see the message output via the output unit 32 of the terminal device 30, contact the user of the vehicle 10, and obtain consent to disclose the history data to a third party.

Further, when the signal that prompts for obtaining user consent includes information indicating that the appraisal amount of the vehicle 10 is improved by disclosing the history data of the vehicle 10 to a third party, the control unit 35 of the terminal device 30 may perform output of this information along with an output that prompts for obtaining consent from the user of the vehicle 10. For example, the control unit 35 may output the difference between the first appraisal amount of the vehicle 10 when the history data of the vehicle 10 is used and the second appraisal amount of the vehicle 10 when the history data of the vehicle 10 is not used, along with the above message, via the output unit 32. Thus, when obtaining user consent to disclose the history data of the vehicle 10 to a third party, a salesperson in the dealer of the vehicle 10 can demonstrate the advantage of disclosing the history data of the vehicle 10 to the user.

As described above, the system 1 according to the present embodiment includes the server 20 and the terminal device 30. The server 20 obtains information regarding consent/non-consent of the user of the vehicle 10 to disclose the history data of the vehicle 10 to a third party, and when determination is made that there is no consent of the user, determination is made regarding whether to transmit a signal that prompts for obtaining the user consent to the terminal device 30, based on at least one of the history data of the vehicle 10 and the user activity information. When receiving a signal that prompts for obtaining user consent from the server 20, the terminal device 30 performs output that prompts for obtaining user consent.

Also, the server 20 according to the present embodiment obtains information regarding consent/non-consent of the user of the vehicle 10 to disclose the history data of the vehicle 10 to a third party. When determination is made that there is no user consent, the server 20 then determines whether to transmit a signal that prompts for obtaining user consent based on at least one of the history data of the vehicle 10, and the user activity information.

Also, the terminal device 30 according to the present embodiment obtains information regarding consent/non-consent of the user of the vehicle 10 to disclose the history data of the vehicle 10 to a third party. The terminal device 30 then communicates with the server 20, and when determination is made that there is no user consent, determines whether to prompt for obtaining of user consent based on at least one of the history data of the vehicle 10 and the user activity information, and when determination is made to prompt for obtaining of user consent, performs output that prompts for obtaining user consent.

According to this configuration, when there is no user consent to disclose the history data of the vehicle 10 to a third party, determination is made regarding whether to transmit a signal that prompts for obtaining user consent, based on at least one of the history data of the vehicle 10 and the user activity information. Thus, a signal that prompts for obtaining user consent can be transmitted just in situations in which user consent is easily obtained, based on at least one of the history data of the vehicle 10 and the user activity information. Thus, the technology of obtaining the user consent regarding the history data of the vehicle 10 is improved with regard to the point of improved likelihood of obtaining the consent of the user of the vehicle 10.

Although the present disclosure has been described above by way of the drawings and the embodiment, it should be noted that one skilled in the art can make various modifications and alterations thereto based on the present disclosure. It should be noted, therefore, that these modifications and alterations are within the scope of the present disclosure. For example, the functions and so forth included in the components, the steps, and so forth, can be rearranged so as not to be logically inconsistent, and a plurality of components, steps, and so forth, can be combined into one, or can be divided.

For example, in the above-described embodiment, the terminal device 30 has been described as being installed at the dealer of the vehicle 10. However, the terminal device 30 may be a computer such as a smartphone used by the user of the vehicle 10, or a computer such as an automotive navigation system installed in the vehicle 10. In such a case, the user of the vehicle 10 can directly view a signal transmitted from the server 20 to the terminal device 30 to prompt for obtaining of user consent. This further facilitates obtaining user consent.

Also, for example, in the above-described embodiment, a configuration may be made in which the terminal device 30 executes part or all of the operations and processes executed by the server 20. Similarly, a configuration may be made in which the server 20 executes part of the operations executed by the terminal device 30. For example, the system 1 may be configured not including the server 20. In such a case, the terminal device 30 may execute the operations and the processes of the server 20 and the terminal device 30 in the above-described embodiment.

Also, an embodiment may be made in which a general-purpose computer, for example, functions as the server 20 or the terminal device 30 according to the above embodiment. Specifically, a program in which is described processing for implementing each function of the server 20 or the terminal device 30 according to the above-described embodiment is stored in memory of the general-purpose computer, and the program is read and executed by a processor. Accordingly, the present disclosure can also be implemented as a program that can be executed by the processor, or a non-transitory computer-readable medium storing the program.

What is claimed is:

1. A system comprising:
a server; and
a terminal device,
the server including a processor configured to:
obtain history data of a vehicle and consent information, the consent information indicating whether a user of a vehicle has provided a consent to disclose the history data of the vehicle to a third party,
determine whether to transmit a signal that prompts for obtaining the consent of the user in a case where the obtained consent information indicates that the consent of the user is not obtained, the determination being made based on the obtained history data, and
wirelessly transmit, to the terminal device, the signal that prompts for obtaining the consent of the user when the determination to transmit the signal is made based on the history data of the vehicle indicating that the vehicle has been in an accident; and
the terminal device is configured to output a graphical display element to obtain the consent of the user when the terminal device receives the signal from the server.

2. The system according to claim 1, wherein:
the processor is configured to obtain a user activity information of the user, and to determine whether to transmit the signal that prompts for obtaining the consent of the user in a case where the obtained consent information indicates that the consent of the user is not obtained, the determination being made based on the obtained user activity information;

the user activity information includes history data of the terminal device owned by the user; and the processor is configured to transmit the signal that prompts for obtaining the consent of the user based on the user activity information when determination is made that the user intends to sell the vehicle.

3. The system according to claim 1, wherein:

the processor is configured to obtain a user activity information of the user, and to determine whether to transmit the signal that prompts for obtaining the consent of the user in a case where the obtained consent information indicates that the consent of the user is not obtained, the determination being made based on the obtained user activity information;

the user activity information includes history of maintenance or inspection of the vehicle; and the processor is configured to transmit the signal that prompts for obtaining the consent of the user based on the user activity information when determination is made that the vehicle is periodically maintained or inspected.

4. The system according to claim 1, wherein the history data of the vehicle includes history data of the vehicle before and after the accident.

5. The system according to claim 1, wherein the processor is configured to calculate a score in which a state of the vehicle is quantified, based on the history data of the vehicle, and transmit the signal that prompts for obtaining the consent of the user when determination is made that the score is included in a predetermined range indicating that the state of the vehicle is good.

6. The system according to claim 1, wherein the processor is configured to transmit the signal that prompts for obtaining the consent of the user when determination is made that the history data of the vehicle contains information for improving an appraisal amount of the vehicle.

7. The system according to claim 6, wherein the signal that prompts for obtaining the consent of the user includes information indicating that the appraisal amount of the vehicle is improved by disclosing the history data of the vehicle to a third party.

8. A non-transitory storage medium storing instructions that are executable by one or more processors in a computer configured to communicate with a server and that cause the one or more processors to perform functions comprising:

obtaining history data of a vehicle;

obtaining consent information indicating whether a user of the vehicle has provided a consent to disclose the history data of the vehicle to a third party;

determining, through wireless communication with the server, whether to prompt for obtaining the consent of the user in a case where the obtained consent information indicates that the consent of the user is not obtained, the determination being made based on the obtained history data; and outputting a graphical display element to obtain the consent of the user, when the determination is made to prompt for obtaining the consent of the user based on the history data indicating whether the vehicle has been in an accident;

wherein the outputting is performed when a signal is received from the server.

9. The non-transitory storage medium according to claim 8, further comprising:

obtaining a user activity information of the user;

determining whether to transmit the signal that prompts for obtaining the consent of the user in a case where the obtained consent information indicates that the consent of the user is not obtained, the determination being made based on the obtained user activity information; and outputting that prompts for obtaining the consent of the user based on the user activity information when determination is made that the user intends to sell the vehicle, wherein the user activity information includes history data of a terminal device owned by the user.

10. The non-transitory storage medium according to claim 8, further comprising:

obtaining a user activity information of the user;

determining whether to transmit the signal that prompts for obtaining the consent of the user in a case where the obtained consent information indicates that the consent of the user is not obtained, the determination being made based on the obtained user activity information; and outputting that prompts for obtaining the consent of the user based on the user activity information, when the determination is made that the vehicle is periodically maintained or inspected, wherein the user activity information includes history of maintenance or inspection of the vehicle.

11. The non-transitory storage medium according to claim 8, further comprising outputting that prompts for obtaining the consent of the user, when the determination is made that the history data of the vehicle contains information that improves an appraisal amount of the vehicle.

12. The non-transitory storage medium according to claim 11, wherein the output that prompts for obtaining the consent of the user includes information indicating that the appraisal amount of the vehicle is improved by disclosing the history data of the vehicle to a third party.

* * * * *